Figure 2:
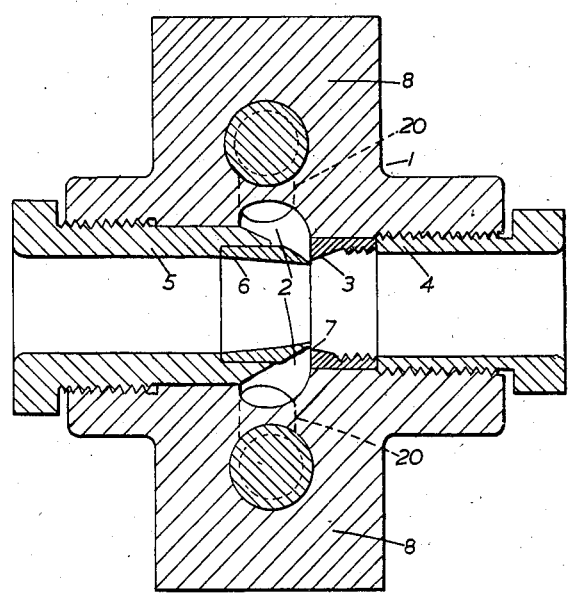

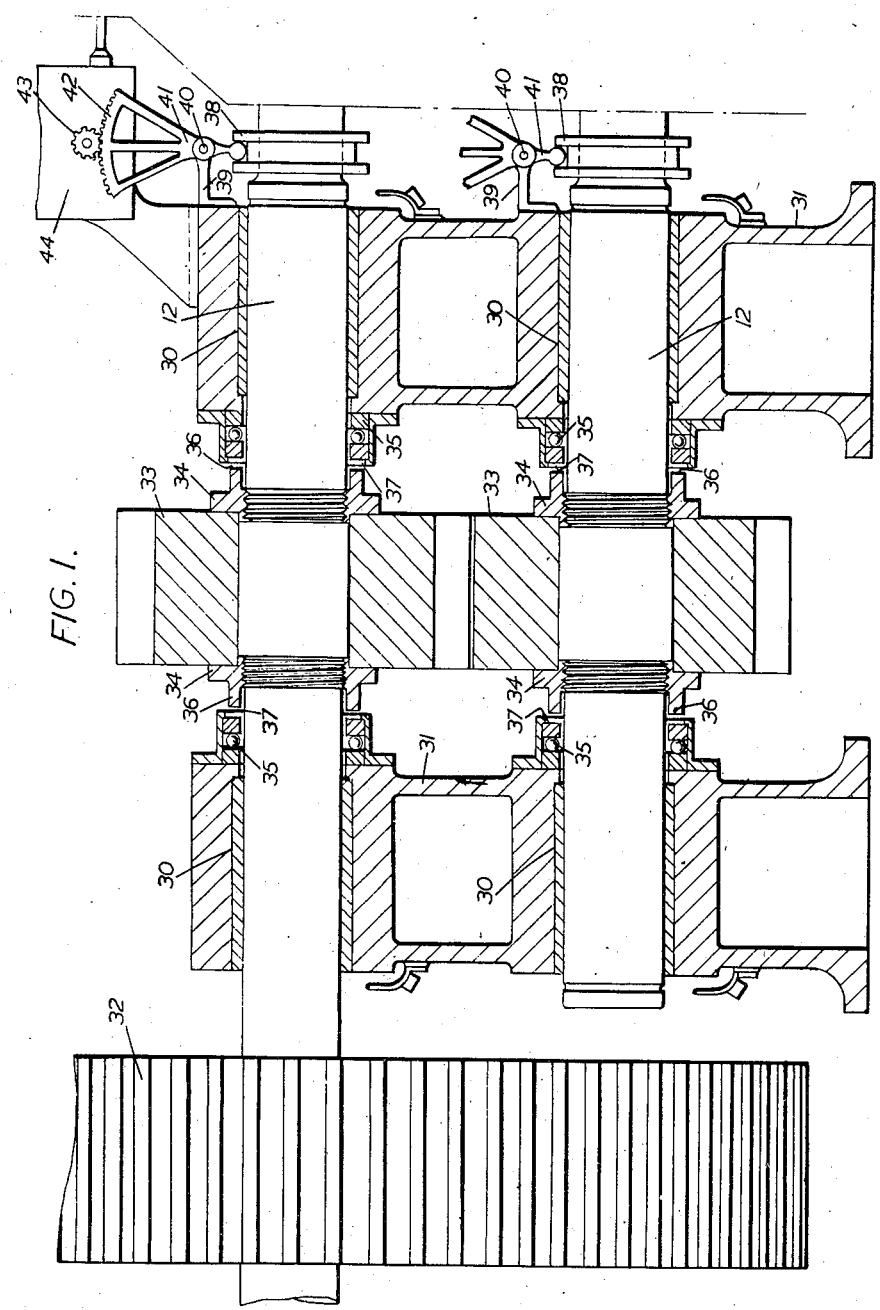
FIG. I.

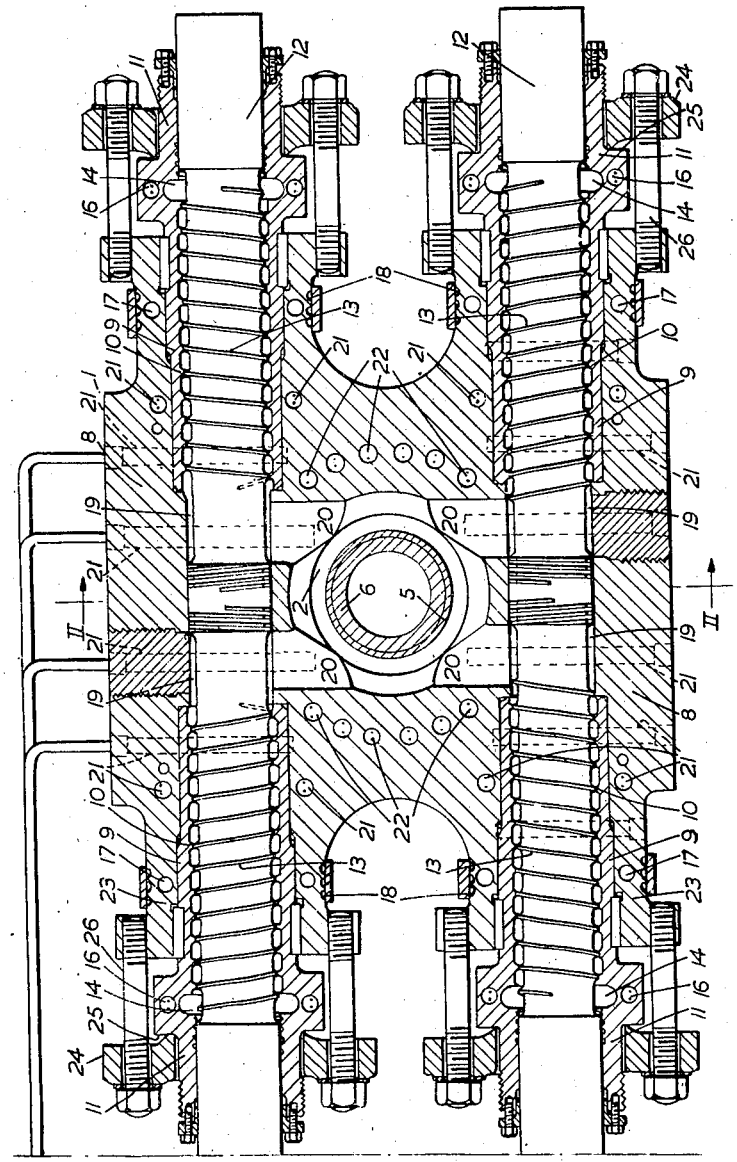

Sept. 23, 1947. F. T. GRIFFITHS 2,427,960
EXTRUSION MACHINE
Filed June 30, 1943 5 Sheets-Sheet 3

Inventor:
Francis T. Griffiths
By
Stebbins and Blenko
His Attorneys

Sept. 23, 1947.  F. T. GRIFFITHS  2,427,960
EXTRUSION MACHINE
Filed June 30, 1943  5 Sheets-Sheet 4
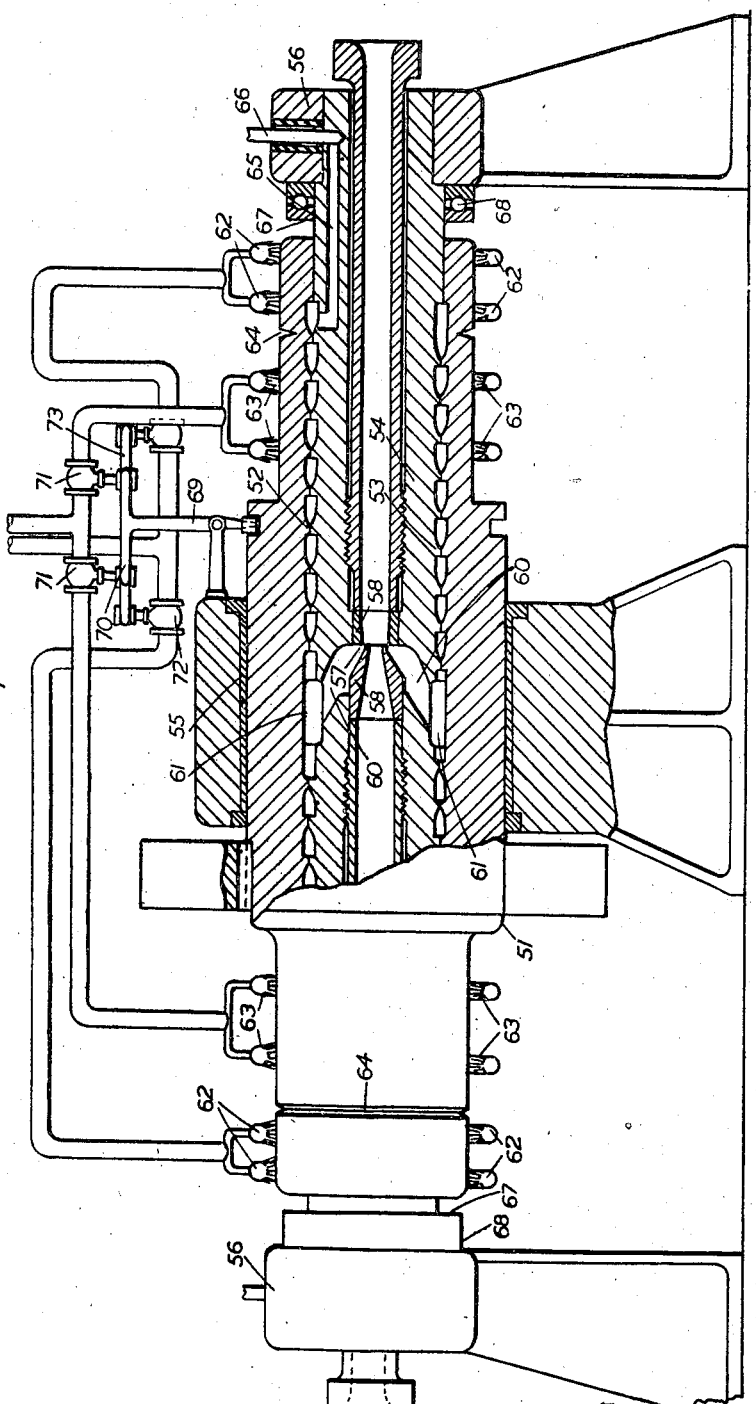
Inventor:
Francis T. Griffiths
By
Stebbins and Blenko
His Attorneys

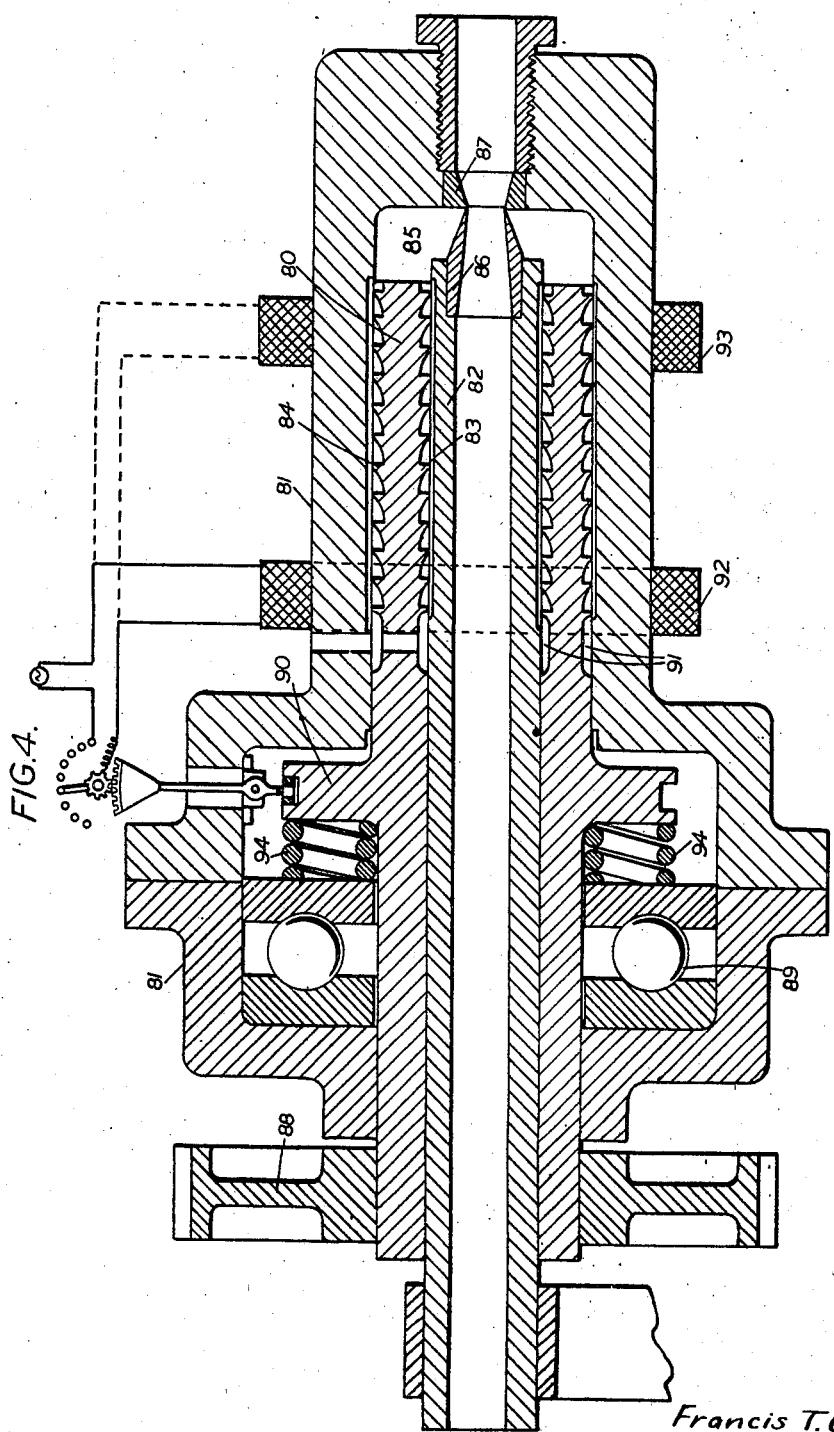

Patented Sept. 23, 1947

2,427,960

UNITED STATES PATENT OFFICE 2,427,960

EXTRUSION MACHINE

Francis Tadman Griffiths, Gravesend, Kent, England, assignor to W. T. Henley's Telegraph Works Company, Limited, Dorking, Surrey, England, a British company Application June 30, 1943, Serial No. 492,851
In Great Britain July 31, 1942

8 Claims. (Cl. 18—12)

This invention is concerned with extrusion machines of the kind in which material in a highly viscous or plastic state is driven forward into an extrusion chamber and to and through a die in the wall thereof or between an inner and outer die by means of a screw thread impelling device. The impelling device usually comprises two longitudinally extending concentric members of which the general cross-sectional shape of the surfaces is circular. The adjacent surfaces on the inner and outer members are so formed, by providing on at least one surface helically extending projections and/or recesses, that relative rotary movement of the two members causes material fed into one end of the annular space between them to be fed forward. Continuous relative rotary movement of the members constituting the impelling device, combined with continuous feeding of the material, results in the continuous delivery of the material in the plastic state to the extrusion chamber and in extrusion of it through the die or between the inner and outer die, as the case may be, by the pressure exerted on it by the following material.

Under normal conditions the output of an extrusion machine of the kind described appears to be dependent among other factors upon the pressure prevailing at the delivery end of the impelling device, an increase in the pressure resulting in an increase in output and, conversely, a decrease in pressure resulting in a decrease in output. The pressure that is necessary in order to extrude material through the extrusion orifice is considerable (of the order of ten to twelve tons per square inch where the material is lead or a lead alloy). It follows, therefore, that there will be exerted a correspondingly great reaction on the member (or members) furnished with the screw thread projections and/or recesses, which reaction will have a considerable component in a direction parallel to the axis of the impelling device and will tend to move the member longitudinally. Hitherto it has been considered necessary to anchor the member against such movement either by rigidly securing it to a support, generally the machine casing, or, where the member is rotatably driven, by inserting one or more heavy thrust bearings between it and a support, generally the casing. In accordance with the present invention, however, I allow one of the two relatively rotatable parts constituting the impelling device, that is subject to axial thrust varying with the pressure in the plastic material, to move axially to a limited extent without positive restraint under the influence of a change in the thrust exerted upon it, and utilise this axial movement to adjust the output of the device automatically in a direction tending to restore it to normal. It will be apparent that, to maintain this permitted axial movement within the predetermined positive limits between which there is no positive restraint, some counter pressure is necessary. In a single impeller type extrusion machine, this may be a spring force opposing the component in an axial direction of the pressure exerted on the axially movable member by the plastic material at the delivery end of the impelling device. In an extrusion machine comprising duplicate impelling devices, the counter pressure opposing the axial thrust exerted by the plastic material on the axially movable member of one impelling device may be provided wholly or in part by the axial thrust exerted on the corresponding member of the other impelling device, which is coupled to it.

There are several ways in which the output of the impelling device (or of each device) of an extrusion machine may be controlled automatically by a permitted axial movement of one of the two relatively rotatable members constituting the device. In the case of a machine for the extrusion of plastic metal, the permitted axial movement of one of the two parts of an impelling device may be such as to produce a relative longitudinal displacement of the two parts of the device such that the effective length of the device is changed and hence the pressure and output of that device correspondingly increased or diminished, as the case may be. Alternatively or in addition, the permitted axial movement of one of the two parts of an impelling device may be employed to operate an electric switch or a valve controlling the supply of heat to, or the abstraction of heat from, an appropriate part or parts of the impelling device. For instance, axial movement of the rotatably driven part of an impelling device relative to the co-operating fixed part due to an excess pressure at the delivery end of the device may automatically increase the amount of heat applied to the forward end of the device and also, or alternatively, decrease the amount of heat abstracted from the feed end of the device, so reducing the pressure at the delivery end.

In the case of an extrusion machine for a material such as rubber or a synthetic plastic, control of the output by axial movement of a part of the impelling device in response to a variation in pressure at the delivery end of it may be obtained by using this movement to control the rate at which stock is fed in, either by adjusting the speed of an automatic feed device or by varying the width of the stock being fed in.

Automatic regulation of output in accordance with my invention is especially valuable in the case of an extrusion machine with a pair of impelling devices forcing material into a common extrusion chamber and out through a common die. With such machines difficulty may be experienced in maintaining the correct pressure at the delivery end of each impelling device. Failure to do this will result in uneven delivery to the extrusion chamber and in a non-uniform product, for instance, a tube with wall thickness that is not uniform, a defect that cannot readily be detected without cutting the product. By applying the present invention to such an extrusion machine any deviation from the normal of, or any out of balance between, the pressure at the delivery ends can be rectified automatically before it reaches a value detrimental to the product.

By way of example and in order that the invention may be more fully understood, some ways in which it may be applied to extrusion machines of various kinds will now be described with the aid of the accompanying drawings wherein, Figure 1 is a longitudinal section of a lead extrusion machine for the production of lead tubing, comprising two pairs of impelling devices, Figure 2 is a cross-section of the machine shown in Figure 1, the section being taken along the line II—II of that figure, Figure 3 is a longitudinal section of a lead extrusion machine comprising a single pair of axially aligned impelling devices, and Figure 4 is a longitudinal section of a lead trusion machine of the type in which a single impelling device is used comprising a rotatably driven sleeve carrying screw threads on its internal and external surfaces.

Figures 1 and 2 of the drawings, to which reference will first be made, show a lead extrusion machine having two pairs of axially aligned screw thread impelling devices, the rotating parts of each pair of which are mechanically coupled together at their delivery ends, disposed on diametrically opposite sides of a central extrusion chamber and with their axes parallel to one another and at right angles to that of the extrusion chamber, as described and claimed in my Patent 2,367,394. The machine casing 1 is in the form of a pair of barrels 8 united by a central block having an aperture which extends from the front to the rear face of the block and at right angles to the two barrels. The central part of this aperture is of increased diameter to form an extrusion chamber 2. An outer extrusion die or matrix 3 is fitted in one of the portions adjacent the enlarged portion of the aperture and is held in place by a tubular nut 4. The other or rear end of the aperture receives a tubular nut 5 constituting a holder for an inner die or point 6 which co-operates with the matrix 5 to form an annular extrusion orifice 7. Both ends of each barrel 8 are counter bored to receive sleeves 9, the inner end parts of the internal surfaces of which are provided with screw threads 10 and the outer end parts of the internal surfaces of which are circumferentially grooved to form sealing glands and bearings 11 for a rotatably driven impeller shaft 12 which extends the whole length of the barrel and projects well beyond the casing at one end thereof. Each impeller shaft 12 carries a pair of screw threads 13 of opposite hand which co-operate with the threads 10 on the two sleeves and with them constitute a substantially thrust-balanced pair of impelling devices. These are fed with molten metal at their outer ends, each from an annular feed chamber 14 which is located in the wall of the sleeve 9 and fed through a feed pipe (not shown). In the regions of the feed chambers 14 it is necessary to apply heat to maintain the metal in a molten state until it is engaged by the impelling surfaces 10 and 13. In the particular example of machine shown in the drawing, this is effected by means of electric heaters 16 inserted in the walls of these parts of the sleeve, but it will be appreciated that other forms of heaters may be used instead. To ensure rapid cooling of the metal to a plastic state when between the impelling surfaces, it is necessary to extract heat from the central part of each impelling device. This is done by circulating a cooling medium, generally water, through passages 17 in the walls of the barrels 8 or through channels 18 in the external surface of the barrel which are closed by a surrounding collar, but again, other methods of cooling are applicable. Under suitable temperature conditions, rotation of the shafts 12 will cause molten metal fed into the impelling devices and there cooled to be impelled forward by the several devices into annular delivery chambers 19 and then through ports 20 into the common extrusion chamber 2. To ensure satisfactory flow of plastic metal through the delivery chambers 19, ports 20 and extrusion chamber 2, it will also generally be necessary to apply heat in the regions of the delivery ends of the impelling devices and in the region of the ports and extrusion chamber. In the particular machine shown, this is done by the provision of electric heaters 21 and 22 in the wall of the casing. The hottest parts of the casing will naturally be those parts in the regions of the feed chambers 14 and the coolest, the parts 23 surrounding the middle parts of the impelling devices. Between each cooled part of the casing and the adjacent feed chamber the cross-sectional area of the casing is substantially reduced to reduce the flow of heat between these parts, in accordance with the invention described and claimed in my copending application, Serial No. 492,852, filed June 30, 1943, for Extrusion machines. This reduction is effected by terminating the end of the barrel a short distance from the adjacent external wall of each feed chamber and holding the sleeve in place in the barrel by means of a collar 24 which engages, over a small area only, an annular face 25 on the sleeve and is drawn towards the barrel by bolts 26. The part of each impeller shaft 12 which projects beyond the casing 1 is supported in a pair of bearings 30 housed in pedestals 31. The upper of the two impeller shafts extends beyond its outer bearing 30 and carries a driving wheel 32. Between its two bearings 30 this upper impeller shaft also carries a gear wheel 33 which engages with a correspondingly positioned gear wheel 33 on the lower impeller shaft so that the latter is driven at the same speed as the upper shaft. The wheels 33 are each secured against longitudinal movement on the shaft by means of a pair of collars 34 which are screwed on the shaft one on each side of the wheel 33. In accordance with the present invention, each impeller shaft 12 is permitted to move axially relative to the casing 1 and the bearings 30 to a limited extent without positive restraint under the influence of change in thrust exerted upon it. The extent to which the impeller shafts 12 are permitted to float axially is determined by the clearances between the end face 36 of each of the collars 34 and the adjacent face 37 of a ball thrust washer 35 secured to the adjacent end face of the neighbouring bearing support. These clearances are preferably such that the total permitted axial movement between the two limits imposed by the ball thrust washers 35 is of the order of one pitch length of the impeller screw 13 or of a fraction thereof. With this arrangement, in the event of an increase in pressure at the delivery end of one, say for instance, the left hand one, of the upper pair of impelling devices, the impeller shaft 12 will move to the left, thus diminishing the effective length of the impeller thread 13 of the left hand device (since a part that was effective will move into a region nearer the feed chamber where it is ineffective) and moving the delivery point to the left and thus further from the port 20 leading to the extrusion chamber 2. The effect will thus be to diminish the pressure in the metal at this port and, therefore, the rate of delivery through the port as compared with that of the right hand impelling device, the delivery from which will be increased, though not necessarily to the same extent, because the delivery point will have approached the right hand port. When a balance of pressure has been obtained, axial movement of the impeller shaft will cease and uniform output from the two upper impelling devices will prevail until an alteration in conditions, for instance, in the temperature of the metal fed to one of these two devices, produces a difference in pressure and output which will be corrected by movement of the floating member either in the same or in the reverse direction, as required. It will be appreciated that, in order to achieve accurate automatic correction of output by utilising the axial movement of a floating, double-acting impeller shaft, it is important that the temperature of the two ports should remain the same, or at least that the difference between their respective temperatures should remain constant.

It may not always be possible to obtain uniformity of output from each of two aligned pairs of impelling devices merely by allowing the impeller shaft to float axially, for the extent to which it may float is limited by practical considerations, and, as indicated above, we prefer, either in addition or as an alternative, to provide for automatic correction of the respective outputs of the two devices of each pair by arranging for axial movement of the impeller shaft to operate an electric switch or a valve controlling the supply of heat to, or abstraction of heat from, an appropriate part of one or both of the impelling devices. To this end, each impeller shaft of the machine shown in Figures 1 and 2 of the drawings carries a circumferentially grooved collar 38 located between the machine casing and the adjacent bearing 30. The support for this bearing carries a bracket 39 with a forked end supporting a pivot pin 40 passing through a rod 41, the lower end of which carries a roller which engages in the groove in the collar 38. The upper end of the rod 41 carries a toothed quadrant 42 which engages a pinion 43 rotation of which operates a temperature control device 44. This device 44 may incorporate a rheostat to control the flow of current through the heaters 21 and certain of the heaters 22, in the region of the delivery end of one of the two impelling devices by which it is actuated, or a valve for controlling the flow of cooling fluid through the channels 17 around one device. Preferably, however, the device is arranged to operate differentially on both impelling devices of the pair. It may, therefore, comprise a double rheostat so that, as the amount of heat applied to the forward end of one device is changed in one direction, the amount of heat applied to the forward end of the other device is correspondingly changed in the reverse direction. In this case, axial movement of the impeller screw in a direction rearwards (i. e. towards the feed end) relative to the device delivering more metal will operate to increase the amount of heat supplied to the forward end of that device and reduce the amount supplied to the other, thereby increasing the slip or shear in the metal in the first device and hence reducing the slip or shear in the other device, and hence reducing the output of the first device and increasing the output of the other device. Alternatively or in addition, the control device 44 may comprise a pair of regulating valves inserted in the pipes conveying water or other cooling fluid to the cooling region of each impelling device of the pair actuating the control device and arranging that the valve stems of these are adjusted simultaneously but in opposite and appropriate directions by rotation of the pinion 43. With such an arrangement, in the event of an excess pressure at the delivery end of one impelling device causing that device to deliver more metal than the other, the impeller shaft will move rearwards relative to the first device, rotate the pinion 43 and adjust the setting of the two valves in such a way as to reduce the flow of cooling fluid to the first device and increase the flow to the other device.

Figure 3 shows how the invention may be applied to a balance lead extrusion machine having a casing 51 which houses or forms the outer concentric parts 52 of two axially aligned screw thread impelling devices of which the inner parts 53 are formed by, or carried on, a tubular stationary member 54 about which the casing rotates. The casing is supported in a central bearing 55 and on the stationary inner member 54 each end of which projects beyond the casing and is engaged by a support 56. The extrusion chamber 57 and its inner and outer dies, 58 and 59 respectively, are co-axial with the impelling devices and are located within the central part of the stationary member 54, the chamber being of annular form and fed with plastic lead through a number of ports 60 from an annular delivery chamber 61 common to both impelling devices. In this machine, temperature control of the impelling devices is effected by heating the extremities of the rotating outer casing 51 by burners 62 and cooling the neighbouring parts by jets 63 of air or water. Here each heated part is heat isolated from the neighbouring cooled part by a circumferential groove 64 in the external surface of the rotating casing, as described and claimed in my co-pending application, Ser. No. 492,852. Material in a liquid state is fed to the opposite ends of the two impelling devices through ports 65 in the wall of the stationary member, the ports themselves being supplied each through a pipe 66 passing through the wall of the support 56 and preferably heat insulated therefrom. The invention is applied by allowing the rotating outer casing 51 to float endwise to a limited extent on the inner supporting member 54 by providing an appropriate clearance between each end face of the casing 51 and the adjacent face 67 of one of a pair of ball thrust washers 68 for which the supports 56 form fixed abutments. The supply and abstraction of heat are controlled by axial movement of the casing in much the same way as described with reference to Figures 1 and 2, in that axial movement of the casing 51 rocks a pivoted lever 69 engaging in a circumferential groove in the casing. In this case however, the free end of the lever carries a cross arm 70, the ends of which are forked and engage each a grooved collar on the stem of one of two valves 71 controlling the supply of water to be sprayed on the outer rotating surface of the casing. It will be seen that movement of the casing in one direction will open one valve and close the other. Alternatively or in addition, valves 72 may be inserted in the supply of gas or other fuel to the burners 62 and controlled differentially by cross arms 73 by the rocking of the lever 69. With this arrangement, movement of the lever in one angular direction will reduce the opening of one valve and increase that of the other, and angular movement of the lever 69 in the converse direction will operate the fuel valves in the reverse direction.

Figure 4 shows the way in which the invention may be applied to an unbalanced form of extrusion machine which, in this particular example, comprises a tubular impelling member 80, which operates in an annular chamber formed between the machine casing 81 and a stationary tubular member 82. The member 80 is provided with screw threads 83 and 84 on its internal and external surfaces respectively. These threads cooperate with surfaces on the walls of the annular chamber to form a pair of concentric impelling devices for impelling plastic metal into an extrusion chamber 85 and thence between an inner die or point 86 carried by the member 82 and an outer die 87 in the front wall of the casing. The tubular impeller member 80 extends rearwardly beyond the casing and is driven by means of a gear wheel 88, the heavy thrust on this member being taken up by means of a massive thrust bearing 89 inserted between a circumferential collar 90 on the rotating member and the rear wall of the casing. Heat is applied to the impelling device in the region of the feed chamber 91 and also towards the delivery end of the device by a pair of induction heating coils 92 and 93, but naturally other methods of heating may be used. Although not shown, suitable cooling means will be provided between these two coils. In applying the invention to this form of machine, I prefer to position the thrust collar 90 on the tubular member well forward of the thrust bearing 89 and to insert between the two parts a number of helical springs 94 which are compressed to an extent depending upon the pressure exerted by the plastic metal on the threads and front end face of the rotating member. With this arrangement it will be seen that the effective length of the impelling device is controlled by the pressure in the plastic metal at the front end of the machine. Thus, if for any reason the pressure increases above normal, the effective length of the impelling device will be reduced and the pressure correspondingly reduced and vice versa. In addition, I may use this limited axial movement of the rotating member 80 to control the supply of current to either or both of the induction heating coils 92 and 93 so as to control the amount of applied heat in accordance with the pressure exerted on the rotating member, as shown diagrammatically in the drawing.

Each of the extrusion machines described with reference to the drawings is shown as furnished with a particular form of arrangement for applying heat to or abstracting heat from the impelling device or devices and a form of control appropriate to the particular heating or cooling means used has been described. It is to be understood, however, that these different forms of heating or cooling means can, in most cases, be used on machines other than of the type on which they are shown. For instance, induction heating coils may be employed on the machine shown in Figures 1 and 3 instead of electric resistance heaters and burners, and resistance heaters can be employed on the machines shown in Figures 3 and 4, although in the former case current collector rings might be necessary.

What I claim as my invention is:

1. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movably mounted member which moves axially to a limited extent without positive restraint under the influence of a change in the thrust exerted upon it by the impelled material, and means actuated by axial movement of the axially movably mounted member, for controlling by heat transfer the temperature of an appropriate part of the impelling device, whereby to adjust the output of the device in a direction tending to restore it to normal.

2. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movably mounted member which moves axially to a limited extent without positive restraint under the influence of a change in the thrust exerted upon it by the impelled material, means for supplying heat to an appropriate part of said impelling device, and means, actuated by axial movement of the axially movably mounted member due to a change in pressure in the plastic material at the delivery end of the impelling device, for regulating the supply of heat to an appropriate part of the device, in a direction to counteract the said change in pressure in the plastic material.

3. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movaby mounted member which moves axially to a limited extent without positive restraint under the influence of a change in the thrust exerted upon it by the impelled material, and means, actuated by axial movement of the axially movably mounted member due to a change in pressure in the plastic material at the delivery end of the impelling device, for regulating the abstraction of heat from an appropriate part of the impelling device, in a direction to counteract the said change in pressure in the plastic material.

4. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movably mounted member which moves axially to a limited extent without positive restraint under the influence of a change in the thrust exerted upon it by the impelled material, means for adjusting the output of said impelling device, and means operatively coupling said output-adjusting means with said axially movable member whereby axial movement of said axially movable member due to a change in pressure in the plastic material at the delivery end of said impelling device actuates said output-adjusting means in a direction to restore the output of the device to normal.

5. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movably mounted member which moves axially to a limited extent without positive restraint under the influence of a change in thrust exerted upon it by the impelled material, an extension on said axially movable member projecting rearwardly of said impelling device, means for adjusting the output of said impelling device, means operatively coupling said output-adjusting means with said extension, whereby axial movement of said extension due to a change in pressure in the plastic material at the delivery end of said impelling device actuates said output-adjusting means in a direction to restore the output of the device to normal.

6. A machine for the extrusion of material in a plastic state, comprising an extrusion chamber having an extrusion orifice, a pair of screw thread impelling devices for driving plastic material into said chamber and out through the orifice, each device comprising two longitudinally extending and relatively rotatable concentric parts, the two devices being in axial alignment with their delivery ends together and a rotatable part of one device being united to the corresponding part of the other device and said united parts constituting an axially movably mounted member which moves axially to a limited extent without positive restraint under the influence of a change in the resultant axial thrust exerted thereon by the impelled material, means for adjusting the outputs of the impelling devices, said means being operable differentially on the two impelling devices, and means operatively coupling said output-adjusting means to said axially movably mounted member, whereby axial movement of said axially movable member due to a change in the resultant axial thrust exerted thereon operates said output-adjusting means in a direction to reduce the resultant axial thrust to normal.

7. A machine for the extrusion of material in a plastic state, comprising an extrusion chamber having an extrusion orifice, a pair of axially aligned screw thread impelling devices for driving plastic material into said chamber and out through the orifice, each device comprising two longitudinally extending and relatively rotatable concentric parts, an axially movably mounted, rotatably driven member carrying a pair of screw threads of opposite hands constituting parts of said impelling devices, a pair of thrust washers, between which said driven member floats axially with respect to the other parts of said impelling devices concentric with said driven member, means for adjusting the outputs of the impelling devices, said means being operable differentially on the two impelling devices, and means operatively coupling said output-adjusting means with a part of said driven member outside said impelling devices, whereby axial movement of said driven member due to a change in the resultant axial thrust exerted thereon operates said output adjusting means in a direction to reduce the resultant axial thrust to normal.

8. A machine for the extrusion of material in a plastic state, comprising an extrusion chamber having an extrusion orifice, a screw thread impelling device for driving plastic material into said chamber and out through the orifice, said device comprising two longitudinally extending and relatively rotatable concentric parts, one of said parts being an axially movably mounted member which moves axially to a limited extent without positive restraint under the influence of a change in the thrust exerted upon it by the impelled material, means for adjusting the output of said impelling device, means for actuating said output-adjusting means in circumferential sliding engagement with said axially movable member and responsive to axial movement thereof, whereby axial movement of said axially movable member due to a change in the pressure of the plastic material at the delivery end of said impelling device actuates said output-adjusting means in a direction to restore the output of the impelling device to normal.

FRANCIS TADMAN GRIFFITHS.

REFERENCES CITED

The following references are of record in the file of this patent:

UNITED STATES PATENTS

| Number | Name | Date |
|---|---|---|
| 1,533,191 | Kaiser et al. | Apr. 14, 1925 |
| 869,307 | Jones | Oct. 29, 1907 |
| 2,076,200 | Horley | Apr. 6, 1937 |
| 2,172,651 | Dunsheath | Sept. 12, 1939 |

FOREIGN PATENTS

| Number | Country | Date |
|---|---|---|
| 656,032 | Germany | Jan. 28, 1938 |
| 24,230 | Austria | May 10, 1906 |